United States Patent [19]

Yamauchi

[11] 4,034,253
[45] July 5, 1977

[54] GLASS COVER PLATE FOR A FLAT DISPLAY PANEL HAVING MARGINAL PROJECTIONS

[75] Inventor: Takashi Yamauchi, Tokyo, Japan

[73] Assignees: Yamato Denshi Co., Ltd., Tokyo; Nippon Electric Kagoshima, Limited, Izumi, both of Japan

[22] Filed: Mar. 25, 1976

[21] Appl. No.: 670,532

[30] Foreign Application Priority Data

Mar. 26, 1975 Japan .............................. 50-40259

[52] U.S. Cl. .............................. 313/317; 313/220; 313/496; 313/519
[51] Int. Cl.² .................... H01J 19/54; H01J 61/30
[58] Field of Search .......... 313/496, 517, 518, 519, 313/220, 497, 512, 317, 514; 220/2.1 R

[56] References Cited

UNITED STATES PATENTS

| 3,286,118 | 11/1966 | Vause et al. ........................ 313/318 |
| 3,811,060 | 5/1974 | Tsujimoto ...................... 313/220 X |
| 3,842,313 | 10/1974 | Van Daelen et al. ......... 313/519 X |
| 3,976,907 | 8/1976 | Yanagisawa et al. ............... 313/519 |

*Primary Examiner*—Palmer C. Demeo
*Attorney, Agent, or Firm*—Hopgood, Calimafde, Kalil, Blaustein & Lieberman

[57] ABSTRACT

A glass cover plate of the type having a shape of a rectangle in outline and comprising an outwardly protruded central portion for covering electrodes of a flat display panel and a peripheral flange having a planar surface for seal to a planar substrate of the display panel. A projection is formed along margins of the flange at least at each corner portion of the rectangle. The projection may extend away from the planar surface substantially in the sense in which the central portion protrudes or extend from the planar surface substantially against the sense in which the central portion protrudes.

18 Claims, 10 Drawing Figures

GLASS COVER PLATE FOR A FLAT DISPLAY PANEL HAVING MARGINAL PROJECTIONS

BACKGROUND OF THE INVENTION

This invention relates to a glass cover plate for a flat display panel, the cover plate being substantially rectangular in outline and having an outwardly protruded central portion.

A display tube is for displaying a luminous display that may be a numeral, a letter, a symbol, and/or the like. A considerable number of the display tubes are made in a form of a flat display panel comprising a rectangular planar substrate of an electrically insulating material, such as glass or ceramics, and a glass cover plate substantially congruent in outline with the substrate. As will later be described more in detail, the substrate has a plurality of electrodes formed thereon or otherwise attached thereto. The cover plate comprises an outwardly protruded central portion for covering the electrodes and a peripheral flange having a substantially planar surface at which the cover plate is sealed to the substrate.

As will also be described in the following with reference to some of the accompanying drawings, a conventional glass cover plate of the type described has been defective in that the outline thereof deforms during manufacture or embossing of the central portion. Although it is possible to avoid the deformation, either complicated processes of manufacture have been indispensable or the cover plates have been deformed in other respects. In either event, the deformation has been harmful to the flat display panels.

SUMMARY OF THE INVENTION

It is therefore an object of this invention to provide a glass cover plate of the type described, which does not harmfully deform during simple processes of manufacture.

A glass cover plate according to this invention is for a flat display panel that comprises a substantially planar substrate made of an electrically insulating material and having a plurality of electrodes attached thereto. The cover plate is of a shape of a substantial rectangle in outline and comprises an outwardly protruding central portion for covering the electrodes and a peripheral flange having a substantially planar surface to be sealed to the planar substrate. In accordance with this invention, the cover plate is provided with a projection along margins of the flange at least at each corner portion of the rectangle. The projection protrudes away from the planar surface substantially in the direction in which the central portion protrudes. The work "direction" is used herein in its meaning differentiated from another word "sense" as in vector mathematics.

Figure 2:
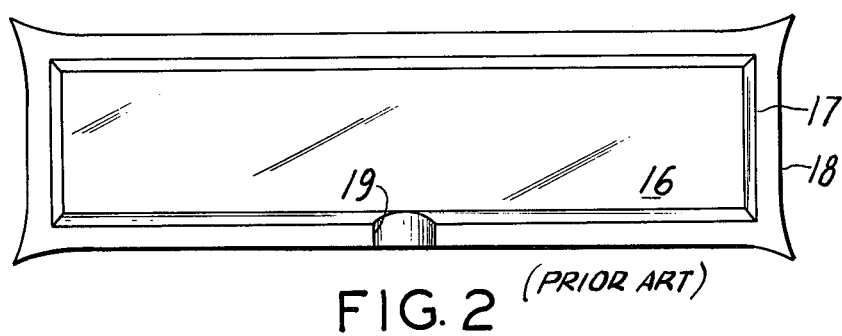
Figure 3:
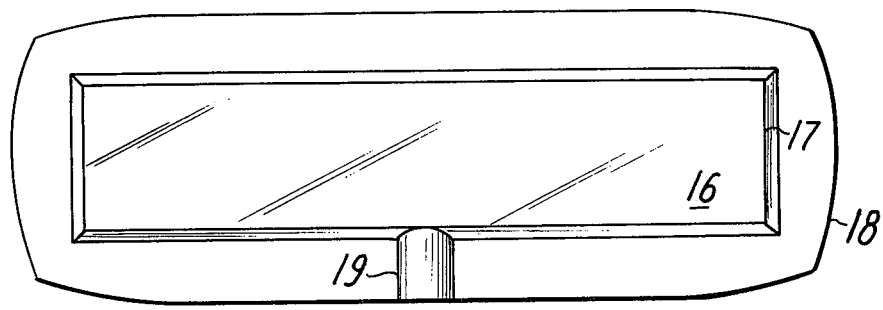
Figure 4:
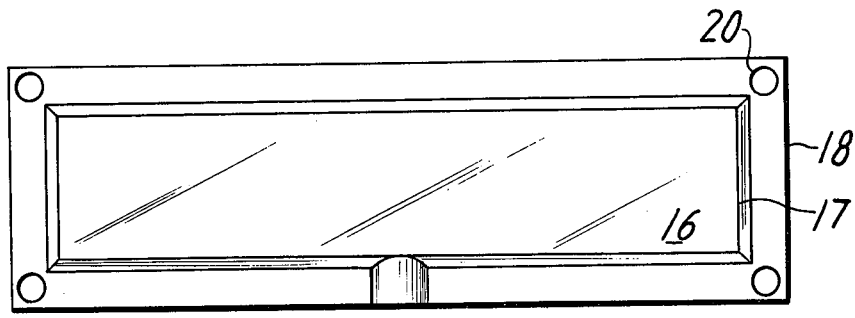
Figure 5:
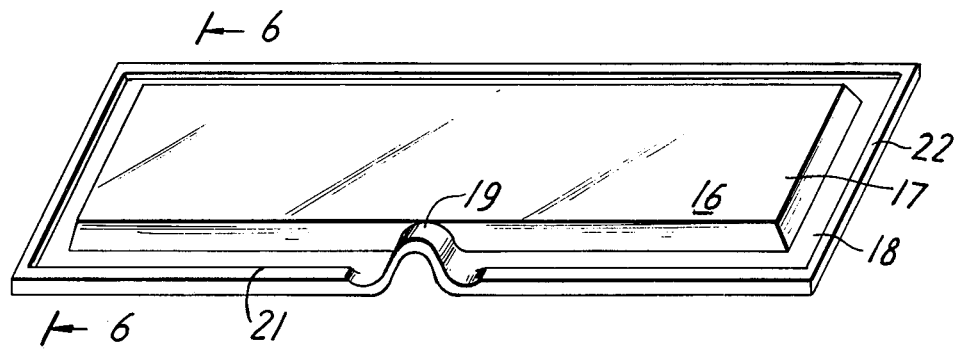
Figure 6:
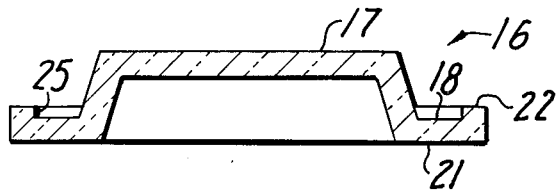
Figure 7:
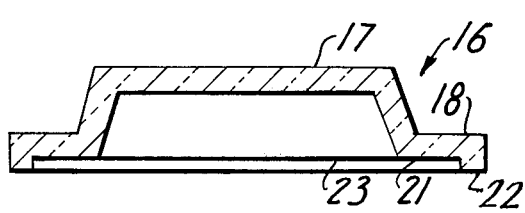
Figure 8:
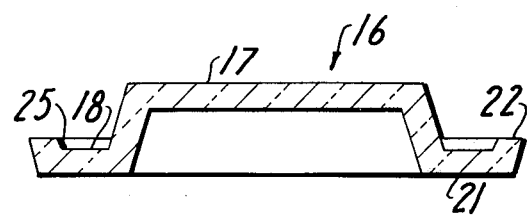
Figure 9:
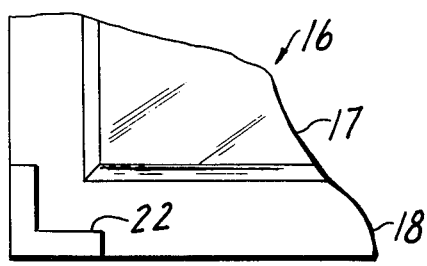
Figure 10:
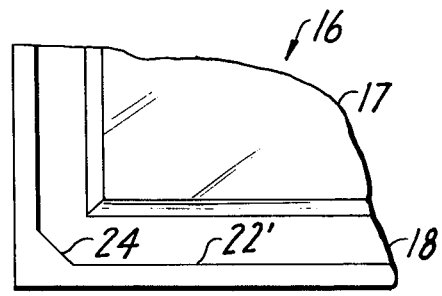

Each of FIGS. 2 to 4 is a schematic plan of a conventional glass cover plate of a flat display panel;

FIG. 5 is a schematic perspective view of a glass cover plate according to a first embodiment of this invention;

FIG. 6 is an enlarged vertical sectional view of the glass cover plate according to the first embodiment, taken on a plane indicated in FIG. 5 by a line 6—6;

FIG. 7 is a vertical sectional view of a glass cover plate according to a second embodiment of this invention;

FIG. 8 is a vertical sectional view of a glass cover plate according to a third embodiment of this invention;

FIG. 9 is a partial plan view of a glass cover plate according to a fourth embodiment of this invention; and FIG. 10 is a fragmentary plan view of a glass cover plate according to a fifth embodiment of this invention.

DESCRIPTION OF THE PREFERRED embodiments

Figure 1:
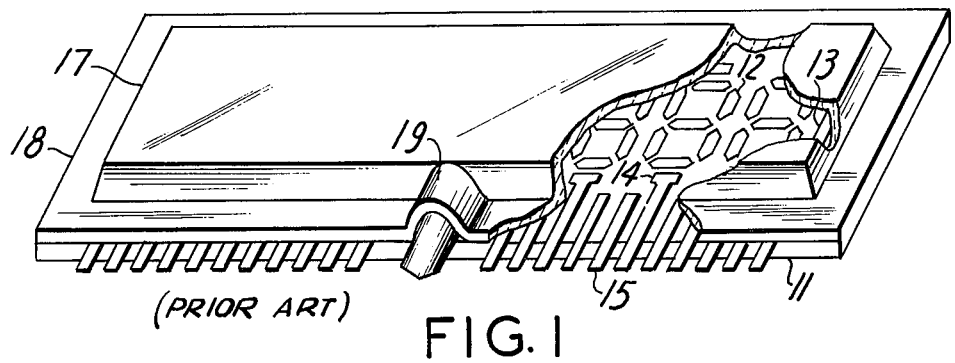
FIG. 1 schematically shows a perspective view of a conventional flat display panel with a portion of a glass cover plate thereof cut away.

Referring to FIG. 1, description will be made at first of a conventional flat display panel of the type known as a fluorescent or phosphorescent display panel. The flat display panel comprises a rectangular substrate 11 of an electrically insulating material, such as glass or ceramics. A plurality of fluorescent or phosphorescent anode segments 12 are formed either in individual indents formed in the substrate 11 or on a surface thereof. A pair of cathode end pieces 13 for supporting one or more hot cathodes (not shown) and a plurality of grid end piece pairs 14 for a like number of grids (not shown) are formed on the substrate surface. Conductive leads 15 are extended from the anode segments 12 and the cathode and grid end pieces 13 and 14 either on the substrate surface or through the body of the substrate 11. In the example being illustrated, the conductive leads 15 are extended beyond the substrate edge. A glass cover plate 16 has a shape congruent with the substrate 11, namely, a shape of a substantial rectangle, in outline and comprises an outwardly (upwards in the drawing) protruding central portion 17 for covering the anode segments 12, the cathode or cathodes, and the grids, a peripheral flange 18 having a substantially planar surface at which the cover plate 16 is hermetically sealed to the substrate 11 with a mass of frit glass (not shown), and a ridge-like portion 19 of the flange 18 for receiving an exhaust pipe hermetically sealed to the substrate 11 and the cover plate 16 again with a mass of frit glass (not shown). After a void formed between the central portion 17 and the opposing part of the substrate 11 is evacuated the exhaust pipe is sealed as shown. In a typical example of a fluorescent or phosphorescent display panel for a plurality of individual displays, such as numerals, a glass cover plate 16 has a width of about 18 mm., a length of about 65 mm., and a flange 18 of a width of about 3 to 4 mm.

The glass cover plate 16 of the type described is manufactured by heating a rectangular glass plate to a temperature selected between about 600° and 1000° C in compliance with the softening point of the glass and pressed between a pair of mould pieces heated to a similar temperature. Alternatively, the glass cover plate 16 is manufactured by heating a rectangular glass plate put on a mould block to a temperature selected between about 600° and 1000° C in accordance with the softening point of the glass so as to make the flange 18 go down either by its own weight or by a load placed thereon.

Referring to FIGS. 2 to 4, a glass cover plate 16 manufactured in the manner described above has an inwardly deformed outline (exaggerated in FIG. 2) due to "draw" or shrinking phenomenon that is inevitable during formation of the central portion 17. The deformed outline renders it difficult to carry out the frit seal. it is not impossible to avoid the deformation by preliminarily cutting the "rectangular" glass plate in a shape that will compensate for the draw phenomenon. This, however, unavoidably complicates the cutting process. Even with this complicated process, the glass cover plate 16 tend either still to have inwardly deformed outlines or to have over-compensated outlines (exaggerated in FIG. 3) due to inevitable differences in the conditions of manufacture. Alternatively, it is possible to reduce the deformation by using a mould having means for preventing the draw phenomenon from occurring. This, however, leaves large scars 20 (FIG. 4) at four corners of the flange 18 to again undesiredly deform the glass cover plate 16. The latter deformation is also objectionable because it renders the flange 18 unduly narrow at the corner portions to adversely affect the sealing operation.

Referring now to FIGS. 5 and 6, a glass cover plate 16 according to a first embodiment of this invention is of the type described hereinabove and comprises an outwardly protruding central portion 17 and a peripheral flange 18. The flange 18 is of a shape of a substantial rectangle in outline and has a substantially planar surface 21 to be sealed to the substrate 11 illustrated with reference to FIG. 1. The cover plate 16 may or may not further comprise a ridge-like portion 19 described also hereinabove. In the example being illustrated, a projection 22 is formed substantially along the whole margins of the flange 18 except the ridge-like portion 19. The projection 22 protrudes away from the planar surface 21 substantially perpendicularly thereof in the upward sense in which the central portion 17 protrudes. The projection 22 may be formed also along the outer margin of the ridge-like portion 19.

Referring to FIG. 7, a glass cover plate 16 according to a second embodiment of this invention is similar to those according to the first embodiment except that the projection 22 protrudes downwardly from the planar surface 21 substantially against the sense in which the central portion 17 protrudes. It will readily be understood that a substrate 11 (not shown in FIG. 7) for use together with a glass cover plate 16 according to the second embodiment should preferably be formed so as to be snugly received in a space 23 enclosed with the planar surface 21 and the projection 22. The projection 22 should be interrupted at portion (not shown) where the conductive leads 15 would extend. Alternatively, the conductive leads 15 should be bent downwardly in the drawing at the front edge of the substrate 11 along the front side surface thereof.

Referring to FIG. 8, a glass cover plate 16 according to a third embodiment of this invention is again similar to those according to the first embodiment. Extending away from the planar surface 21 substantially in the direction and sense in which the central portion 17 protrudes, the projection 22 protrudes horizontally outwardly away from the central portion 17 with an obtruse angle formed with the planar surface 21. According to a modification of the third embodiment, the projection 22 protrudes from the planar surface 21 generally downwardly and outwardly (horizontally) with an obtuse angle with respect to the planar surface 21.

Referring to FIG. 9, a glass cover plate 16 according to a fourth embodiment of this invention is still again similar to those according to the first embodiment except that the projection 22 extends along the margins of the flange 18 approximately the width thereof from each corner point of the rectangle. The projection pieces 22 thus formed at the four corner portions of the flange 18 may protrude in whichever of the senses substantially in the vertical direction in which the central portion 17 protrudes.

Referring to FIG. 10, a glass cover plate 16 according to fifth embodiment of this invention has a projection 22 with a corner expanse 24 extended from each corner point of the rectangle along the flange surface towards the central portion 17 so as to join projection portions extending from the said each corner point along two adjacent margins of the flange 18. The projection 22 with the expanse 24 may protrude in whichever of the sense of the substantially vertical direction. The projection portions may be the projection piece 22 illustrated with reference to FIG. 9. When the projection or projection pieces 22 are protruded together with the expanse 24 generally against the sense in which the central portion 17 protrudes, it is preferable that the substrate 11 be correspondingly shaped.

The projection 22, as generally called hereinafter, namely, the single continuous projection 22 or the projection pieces 22 with or without the expanses 24, may have a width of the order of 1 mm. and the height of only from about 0.1 to 0.5 mm. It is quite astonishing that the projection 22 prevents the undesired and harmful deformation of the outline of the glass cover plates 16 from occurring and provides excellent glass cover plates 16 of the type described. When the projection 22 is protruded substantially against the sense in which the central portion 17 protrudes, one or more indents formed between the projection 22 and the center portion 17 as indicated at 25 in FIGS. 6 and 8 serve to facilitate mounting of the flat display panel in a casing (not shown). The corner expanses 24 reduces the stress which would otherwise accumulate in the glass cover plate 16 during manufacture of the central portion 17.

The projection 22 may form an acute angle with the planar surface 21 so that the tip ends thereof may approach the central portion 17. The flat display panel may be a gas discharge or a plasma display panel of the matrix or segmented electrode type and of the internal or external electrode type, ont of the electrode groups being formed on the substrate 11 and the other electrode group being either formed on the inner surface of the central portion 17 or supported in the above-mentioned void above and by the substrate 11. The flat display panel may also be of a type that comprises cathode glow elements as in the so-called Nixie tubes or photodiodes. The substrate 11 may protrude beyond one or both opposing edge of the glass cover plate 16 with the conductive leads 15 reaching the substrate edge or edges without further protruding therefrom, particularly when the projection 22 is directed substantially in the sense in which the central portion 17 protrudes.

What is claimed is:

1. In a glass cover plate for a flat display panel comprising a substantially planar substrate made of an electrically insulating material and having a plurality of electrodes attached thereto, said cover plate being of a shape of a substantial rectangle in outline and comprising an outwardly protruding central portion for covering said electrodes and a peripheral flange having a substantially planar surface to be sealed to said planar substrate, the improvement wherein said cover plate is provided with a projection along margins of said flange at least at each corner portion of said rectangle, said projection protruding away from said planar surface substantially in the direction in which said central portion protrudes.

2. A glass cover plate as claimed in claim 1, wherein said projection protrudes substantially perpendicularly of said planar surface.

3. A glass cover plate as claimed in claim 1, wherein said projection has a width of the order of 1 mm. and a height of from about 0.1 to 0.5 mm.

4. A glass cover plate as claimed in claim 1, wherein portions of said projection extend along said intersecting margins of said flange from each corner point of said rectangle for a distance approximately equal to the width of said flange.

5. A glass cover plate as claimed in claim 1, wherein said projection extends along substantially the entire periphery of said flange.

6. A glass cover plate as claimed in claim 1, wherein said projection has a corner expanse extending inwardly from each corner point of said rectangle along said flange towards said central portion so as to join the portions of said projection extending along two adjacent margins of said flange.

7. A glass cover plate as claimed in claim 1, wherein said projection protrudes at an obtuse angle with respect to said planar surface away from said central portion.

8. A glass cover plate as claimed in claim 7, wherein said projection has a width of the order of 1 mm. and a height from said planar surface of from about 0.1 to 0.5 mm.

9. A glass cover plate as claimed in claim 7, wherein said projection extends along intersecting margins of said rectangular flange from each corner point for a distance approximately equal to the width of said flange.

10. A glass cover plate as claimed in claim 7, wherein said projection extends along substantially the entire periphery of said flange.

11. A glass cover plate as claimed in claim 7, wherein said projection has a corner expanse extending inwardly from each corner point of said rectangle along said flange towards said central portion so as to join the portions of said projection extending along two adjacent margins of said flange.

12. In a glass cover plate for a flat display panel comprising a substantially planar substrate made of an electrically insulating material and having a plurality of electrodes attached thereto, said cover plate being substantially of the shape of a rectangle in outline and comprising an outwardly protruding central portion for covering said electrodes and a peripheral flange having a substantially planar surface to be sealed to said planar substrate, the improvement wherein said cover plate is provided with a projection along the margins of said flange at least at each corner portion of said rectangle, said projection protruding away from said planar surface in a direction substantially opposed to the direction in which said central portion protrudes.

13. A glass cover plate as claimed in claim 12, wherein said projection protrudes substantially perpendicularly of said planar surface.

14. A glass cover plate as claimed in claim 12, wherein said projection has a width of the order of 1 mm. and a height of from about 0.1 to 0.5 mm.

15. A glass cover plate as claimed in claim 12 in which said projection protrudes from said planar surface at an obtuse angle.

16. A glass cover plate as claimed in claim 12 in which said projection and said planar surface define a peripheral recess in said cover plate which recess is configured to fit over at least a portion of the periphery of said substrate.

17. A glass cover plate as claimed in claim 12, wherein said projection extends along intersecting margins of said rectangular flange from each corner point for a distance approximately equal to the width of said flange.

18. A glass cover plate as claimed in claim 12, wherein said projection extends along substantially the entire periphery of said flange.

* * * * *